(12) United States Patent
Lack et al.

(10) Patent No.: US 8,935,915 B2
(45) Date of Patent: Jan. 20, 2015

(54) AMMONIA STORAGE ON AN SCR CATALYST

(71) Applicant: International Engine Intellectual Property Company, LLC, Lisle, IL (US)

(72) Inventors: Adam C. Lack, New York, NY (US); Navtej Singh, Arlington Heights, IL (US); Paul Boon Charintranond, Elmhurst, IL (US); Michael James Miller, Mt. Prospect, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 0 days.

(21) Appl. No.: 14/071,000

(22) Filed: Nov. 4, 2013

(65) Prior Publication Data

US 2014/0182273 A1    Jul. 3, 2014

Related U.S. Application Data

(60) Provisional application No. 61/722,342, filed on Nov. 5, 2012.

(51) Int. Cl.
| | |
|---|---|
| *F01N 3/00* | (2006.01) |
| *F02D 41/14* | (2006.01) |
| *B01D 53/94* | (2006.01) |
| *F01N 9/00* | (2006.01) |

(52) U.S. Cl.
CPC ........ *F02D 41/1463* (2013.01); *B01D 53/9495* (2013.01); *F01N 9/005* (2013.01)

USPC .................. 60/286; 60/274; 60/276; 60/301; 60/303

(58) Field of Classification Search
CPC ....... F01N 3/206; F01N 3/2066; F01N 3/208; F01N 3/0871; F01N 2610/02; F01N 2900/0408; F01N 2900/0412; F01N 2900/1614; F01N 2900/1621; F01N 9/005
USPC .................. 60/274, 276, 286, 297, 301, 303
See application file for complete search history.

(56) References Cited

U.S. PATENT DOCUMENTS

| | | | |
|---|---|---|---|
| 7,178,328 B2 * | 2/2007 | Solbrig ............................ | 60/286 |
| 8,555,616 B2 * | 10/2013 | Gady ............................... | 60/286 |
| 8,640,448 B2 * | 2/2014 | Geveci et al. .................... | 60/301 |
| 8,733,083 B2 * | 5/2014 | Ofoli et al. ....................... | 60/286 |
| 8,813,477 B2 * | 8/2014 | Yasui et al. ...................... | 60/286 |
| 8,826,644 B2 * | 9/2014 | Ponnathpur ...................... | 60/285 |
| 2012/0247089 A1 | 10/2012 | Griffin et al. | |

* cited by examiner

*Primary Examiner* — Binh Q Tran
(74) *Attorney, Agent, or Firm* — Jeffrey P. Calfa; Mark C. Bach

(57) ABSTRACT

A system and method for calculating quantity of ammonia stored on an SCR catalyst at various times during an interval of time by processing certain data, including the aggregate quantity of ammonia introduced into an exhaust flow during the interval of time, calculating the efficiency of catalytic conversion of NOx to $N_2$ and $H_2O$ by ammonia at each of the various times by processing certain data, including NOx measurements obtained from upstream and downstream NOx sensors, and establishing a correlation between efficiency of catalytic conversion of NOx to $N_2$ and $H_2O$ by ammonia and quantity of ammonia stored on the SCR catalyst over the interval of time which comprises calculated efficiency of catalytic conversion of NOx and calculated quantity of ammonia stored on the SCR catalyst at each of the various times.

12 Claims, 2 Drawing Sheets

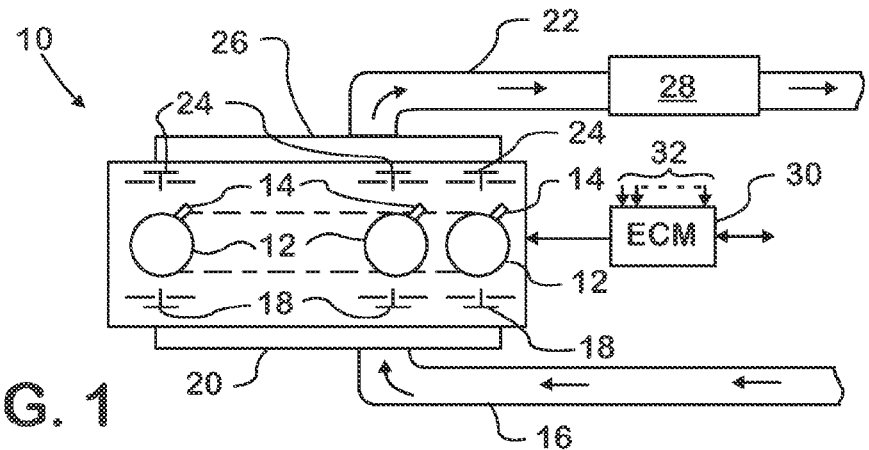
FIG. 1
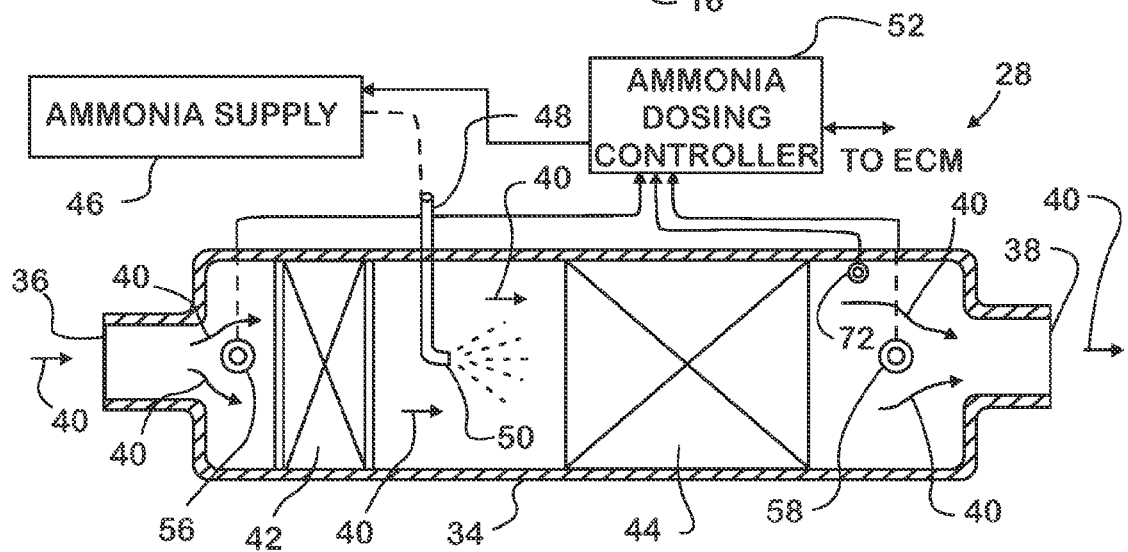
FIG. 2
FIG. 3

AMMONIA STORAGE ON AN SCR CATALYST

TECHNICAL FIELD

This disclosure relates generally to Selective Catalytic Reduction (SCR) of Nitrogen Oxides (NOx) in a flow of gaseous products of combustion, and more particularly to a system and method for establishing a correlation, over an interval of time, between efficiency of catalytic conversion of NOx to Nitrogen ($N_2$) and water ($H_2O$) by ammonia ($NH_3$) being introduced into the flow and quantity of ammonia stored on an SCR catalyst for catalytically converting NOx in the flow.

BACKGROUND

One technology for after-treatment of engine exhaust utilizes SCR to enable certain chemical reactions to occur between NOx in the exhaust and ammonia ($NH_3$) introduced into an engine exhaust system upstream of an SCR catalyst to entrain with exhaust flowing toward the SCR catalyst on surfaces of which ammonia is stored. Those reactions convert NOx into Nitrogen ($N_2$) and water ($H_2O$), two constituents found in abundance in earth's atmosphere. NOx and $NH_3$ are the only reactants in certain of those reactions while Oxygen ($O_2$), which may be present in the exhaust, is a third reactant in other reactions.

Ammonia is introduced in sufficient quantity to maintain a presence of ammonia on surfaces of the SCR catalyst where the chemical reactions which reduce NOx take place.

SUMMARY

A quantity of ammonia introduced into the exhaust system can be measured in any of various ways. However, that measurement doesn't necessarily equate to a quantity of ammonia which is being consumed to reduce NOx. Ammonia is stored on surfaces of an SCR catalyst, and at times, such as when exhaust flow commences, an excess of ammonia is introduced for building the quantity of ammonia stored on the SCR catalyst. When the quantity of ammonia stored on the SCR catalyst reaches the maximum ammonia storage capacity of the SCR catalyst, any quantity of ammonia in excess of the quantity needed to reduce NOx is not consumed and instead passes through the SCR catalyst and into the atmosphere. This excess is referred to as ammonia slip.

The presently disclosed subject matter relates to establishing a correlation, over an interval of time, between efficiency of catalytic conversion of NOx to Nitrogen ($N_2$) and water ($H_2O$) by ammonia ($NH_3$) being introduced into an exhaust flow and quantity of ammonia stored on an SCR catalyst for catalytically converting NOx in the flow.

At the beginning of that interval of time, the quantity of ammonia stored on the SCR catalyst is less than the maximum ammonia storage capacity of the SCR catalyst. That quantity may be zero. The quantity of ammonia introduced into the exhaust flow by an ammonia delivery system is controlled to build the quantity of ammonia stored on the SCR catalyst toward the maximum ammonia storage capacity of the SCR catalyst while avoiding ammonia slip. When the quantity of ammonia stored on the SCR catalyst reaches the maximum ammonia storage capacity of the SCR catalyst, the continued introduction of ammonia continues attempting to build ammonia storage on the SCR catalyst, but it is at that point that ammonia slip occurs. Ammonia slip can be detected by an ammonia sensor downstream of the SCR catalyst.

One general aspect of the disclosed subject matter relates to an internal combustion engine as described in independent claim 1.

Another general aspect of the disclosed subject matter relates to a method as described in independent claim 5.

Another general aspect of the disclosed subject matter relates to a system as described in independent claim 9.

The foregoing summary is accompanied by further detail of the disclosure presented in the Detailed Description below with reference to the following drawings which are part of the disclosure.

BRIEF DESCRIPTION OF THE DRAWINGS

FIG. 1 is a general schematic diagram of an internal combustion engine which utilizes SCR to reduce NOx in engine exhaust by chemical reaction with ammonia introduced into the exhaust.

FIG. 2 is a diagram illustrating detail of a NOx reduction system present in FIG. 1.

FIG. 3 is a diagram of an algorithm for estimating a quantity of reductant ($NH_3$) consumed by chemical reaction with NOx in the NOx reduction system of FIG. 2.

DETAILED DESCRIPTION

Figure 4:
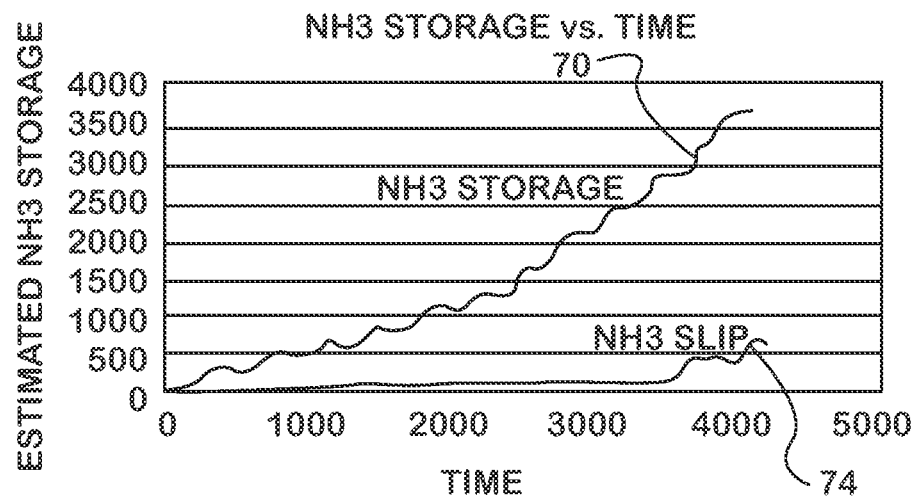
FIG. 4 is a graph plot showing quantity of ammonia stored on an SCR catalyst as a function of time over an interval of time.

FIG. 1 shows a representative internal combustion engine 10 which can be used in stationary or mobile applications. For example, engine 10 may be a diesel engine which comprises structure forming a number of engine cylinders 12 into which fuel is injected by fuel injectors 14 to combust with air which has entered combustion chamber spaces of engine cylinders 12 through an intake system 16 when cylinder intake valves 18 for controlling admission of air from an intake manifold 20 into respective engine cylinders 12 are open. Other components which may be present in intake systems of contemporary diesel engines, such as a turbocharger compressor and charge air cooler, are not shown.

Engine 10 also comprises an exhaust system 22 through which engine exhaust created by combustion of injected fuel in the combustion chamber spaces to operate engine 10 is conveyed to atmosphere. Cylinder exhaust valves 24 control admission of exhaust from respective engine cylinders 12 into an exhaust manifold 26 for further conveyance through exhaust system 22.

Exhaust system 22 includes an exhaust after-treatment system 28 for treating exhaust prior to entry into the atmosphere. Other components which may be present in exhaust systems of contemporary diesel engines, such as a turbocharger turbine, are not shown.

A processor-based engine control module (ECM) 30 controls various aspects of engine operation, such as fueling of engine cylinders 12 by fuel injectors 14. Control is accomplished by processing various input data, indicated generally by reference numeral 32, to develop control data for control of functions being performed by various devices.

Exhaust after-treatment system 28 is shown in detail in FIG. 2 to comprise structure through which exhaust is constrained to pass. The particular structure shown comprises a generally cylindrical housing 34 having an axial length, an exhaust entrance 36 at an upstream axial end, and an exhaust exit 38 at a downstream axial end. Arrows 40 indicate a direction of exhaust flow into, through, and out of interior space of housing 34.

Within its interior space, housing 34 contains a diesel oxidation catalyst (DOC) 42 downstream of exhaust entrance 36 and an SCR catalyst 44 downstream of DOC 42. Exhaust which enters the interior space of housing 34 through exhaust entrance 36 is forced to pass first through DOC 42 and subsequently through SCR catalyst 44 before exiting through exhaust exit 38. DOC 42 treats engine exhaust by removing certain entrained matter, such as the soluble organic fraction of diesel particulate matter. SCR catalyst 44 treats engine exhaust by reducing NOx according to chemical reactions such as:

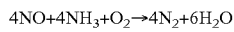

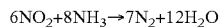

SCR catalyst 44 may be a type which not only reduces NOx but also traps entrained particulate matter (soot) and therefore requires occasional regeneration.

An ammonia supply 46 stores ammonia which is used for NOx reduction. Ammonia from supply 46 is introduced by an ammonia delivery system into the interior of housing 34 through a conduit 48 having an outlet 50 disposed at a location downstream of DOC 42 and upstream of SCR catalyst 44. FIG. 2 is intended to portray good distribution of ammonia within the exhaust flow without reference to specific structural details of how that is accomplished so that a continuing presence of ammonia can be assured over as large a surface area of SCR catalyst 44 as possible.

A processor-based ammonia dosing controller 52 controls the ammonia delivery system's introduction of ammonia from ammonia supply 46 into housing 34 by processing various data, including data from ECM 30 with which it has communication. Controller 52 also processes data according to an algorithm for estimating a quantity of ammonia consumed by conversion of NOx in exhaust passing through exhaust system 22. That algorithm 54, which is the subject matter of commonly owned pending patent application Ser. No. 61/722,338, filed Nov. 5, 2012, will be explained with reference to FIG. 3.

The algorithm processes data indicating a quantity of NOx as measured at a location upstream of outlet 50 and data indicating a quantity of NOx as measured at a location downstream of SCR catalyst 44. These data are provided respectively by an upstream NOx sensor 56 upstream of DOC 42 and a downstream NOx sensor 58, both shown in FIG. 2. Assuming that NOx sensor 58 is insensitive to ammonia, it should provide a reasonably accurate measurement of NOx in the presence of any ammonia slip. NOx sensor 56 may be replaced by a sufficiently accurate virtual NOx sensor.

Controller 52 processes data from NOx sensor 56 indicating a quantity of NOx in untreated, i.e. "engine out", exhaust and data from NOx sensor 58 indicating a quantity of NOx in exhaust which has been treated by SCR using ammonia stored on the surface of SCR 44. The processing performs a first calculation 60 which yields a fraction equal to the quantity of NOx indicated by downstream NOx sensor 58 divided by the quantity of NOx indicated by upstream NOx sensor 56. A second calculation 62 subtracts the calculated fraction from unity, leaving a resulting fraction representing the fraction of NOx which has been reduced.

Using the three chemical reactions given above and the result of calculation 62, algorithm 54 performs a calculation 64 of a quantity of ammonia which would have been consumed in order to reduce NOx to the resulting fraction calculated by step 62. However, the result of that calculation is based solely on the chemistry of the reactions and doesn't take into account exhaust flow. An estimate of the actual consumption is therefore calculated by a calculation 66 which multiplies the result of calculation 64 by exhaust flow as measured or estimated in any suitably appropriate way. Depending on the unit of measurement of exhaust flow, a calculation 68 may be needed to convert the result of calculation 66 to desired units of ammonia consumption.

The processor of controller 52 also processes data according to another algorithm which is operable a) to calculate the quantity of ammonia stored on SCR catalyst 44 at various times during an interval of time by processing certain data, including the aggregate quantity of ammonia introduced into exhaust system 22 by the ammonia delivery system during the interval of time, b) to calculate the efficiency of catalytic conversion of NOx to $N_2$ and $H_2O$ by ammonia at each of the various times by processing certain data, including NOx measurements obtained from upstream NOx sensor 56 and downstream NOx sensor 58, and c) to establish a correlation between efficiency of catalytic conversion of NOx to $N_2$ and $H_2O$ by ammonia and quantity of ammonia stored on SCR catalyst 44 over the interval of time. The correlation comprises calculated efficiency of catalytic conversion of NOx to $N_2$ and $H_2O$ by ammonia and calculated quantity of ammonia stored on SCR catalyst 44 at each of the various times.

FIG. 4 shows an interval of time T starting at zero seconds when exhaust first begins flowing through exhaust system 22 and ammonia first begins to be introduced into exhaust system 22. A trace 70 represents a functional relationship of quantity of ammonia stored on SCR catalyst 44 as a function of time during interval of time T. Trace 70 is developed by the processor of controller 52 calculating a quantity of ammonia stored on SCR catalyst 44 at each of various times during interval of time T. The calculation is performed at each of the various times by measuring the aggregate quantity of ammonia which has been introduced into exhaust system 22 over a period of time beginning at zero seconds and ending at the time of the calculation. From each of those measurements is subtracted a calculation of quantity of ammonia consumed since zero seconds of time. The difference is the quantity of ammonia stored on SCR 44 at that time.

The quantities of ammonia stored on SCR 44 at various times are then plotted on a graph plot shown in FIG. 4 in correlation with each of those various times to create a trace 70. Controller 52 controls the introduction of ammonia into the exhaust flow over the interval of time T by causing ammonia storage on SCR catalyst 44 to build in discrete incremental quantities after each of which the introduction of ammonia is controlled to maintain the quantity of ammonia stored on SCR catalyst 44 substantially constant until the ammonia storage is incremented by an immediately following incremental quantity of ammonia, as shown by trace 70.

FIG. 2 shows the presence of an ammonia sensor 72 downstream of after-treatment system 28 for detecting ammonia slip FIG. 4 shows a second trace 74 which discloses the time at which slip begins. That time defines the maximum ammonia storage capacity of SCR catalyst 44 on trace 70. FIG. 4 shows that the manner of building ammonia on SCR catalyst 44 occurs without any significant slip so that as a result, the commencement of noticeable slip correctly indicates the maximum ammonia storage capacity of SCR 44.

Figure 5:
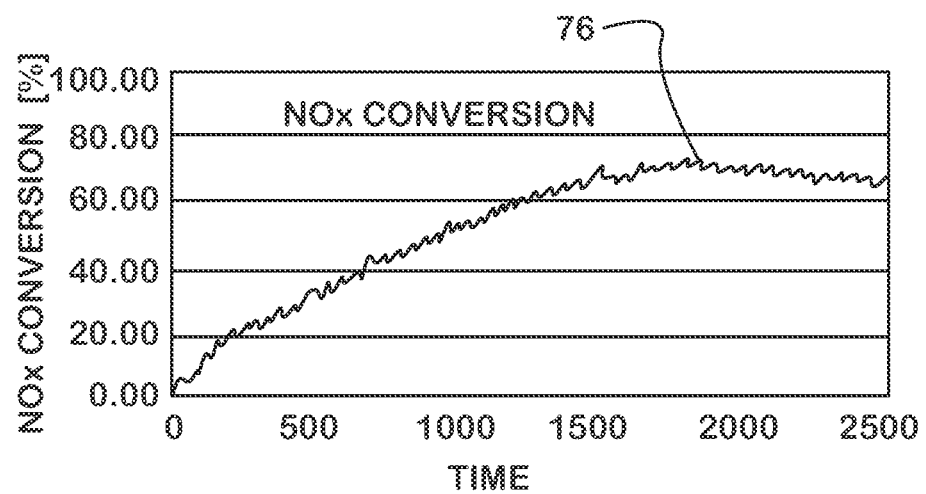
FIG. 5 is a graph plot showing efficiency of NOx conversion occurring over the same interval of time as in FIG. 4.

FIG. 5 shows a trace 76 of NOx conversion during an initial segment of interval of time T in terms of percentage conversion. Trace 76 is developed by processing NOx measurements from upstream NOx sensor 56 and downstream NOx sensor 58. Using time, trace 76 and trace 70 can be correlated to thereby correlate storage capacity of SCR catalyst 44 and efficiency of NOx conversion.

What is claimed is:

1. An internal combustion engine comprising:
   combustion chambers within which fuel is combusted to operate the engine;
   an intake system through which air for supporting combustion is introduced into the combustion chambers;
   an exhaust system comprising an SCR catalyst through which exhaust resulting from combustion in the combustion chambers passes to atmosphere;
   an ammonia delivery system for introducing ammonia into the exhaust system upstream of the SCR catalyst for entrainment with exhaust flow toward the SCR catalyst to build ammonia storage on the SCR catalyst;
   an upstream NOx sensor upstream of the introduction of ammonia into the exhaust system;
   a downstream NOx sensor downstream of the SCR catalyst; and
   a processor for controlling the introduction of ammonia into the exhaust system by the ammonia delivery system over an interval of time in sufficient quantity without significant ammonia slip past the SCR catalyst until the quantity of ammonia stored on the SCR catalyst reaches substantially the maximum ammonia storage capacity of the SCR catalyst;
   the processor also comprising an algorithm which is operable a) to calculate the quantity of ammonia stored on the SCR catalyst at various times during the interval of time by processing certain data, including the aggregate quantity of ammonia introduced into the exhaust system by the ammonia delivery system during the interval of time, b) to calculate the efficiency of catalytic conversion of NOx to $N_2$ and $H_2O$ by ammonia at each of the various times by processing certain data, including NOx measurements obtained from the upstream NOx sensor and the downstream NOx sensor, and c) to establish a correlation between efficiency of catalytic conversion of NOx to $N_2$ and $H_2O$ by ammonia and quantity of ammonia stored on the SCR catalyst over the interval of time which comprises calculated efficiency of catalytic conversion of NOx to $N_2$ and $H_2O$ by ammonia and calculated quantity of ammonia stored on the SCR catalyst at each of the various times.

2. The engine set forth in claim 1 in which the algorithm is also operable to control the introduction of ammonia into the exhaust flow by the ammonia delivery system over the interval of time by causing ammonia storage on the SCR catalyst to build in discrete incremental quantities after each of which the introduction of ammonia is controlled to maintain the quantity of ammonia stored on the SCR catalyst substantially constant until the ammonia storage on the SCR catalyst is incremented by an immediately following incremental quantity of ammonia.

3. The engine set forth in claim 1 including an ammonia sensor downstream of the SCR catalyst for detecting ammonia slip.

4. The engine set forth in claim 3 in which the processor is also operable during the interval of time to correlate quantity of ammonia stored on the SCR catalyst and quantity of ammonia slip detected by the ammonia sensor.

5. A method of establishing a correlation between ammonia stored on an SCR catalyst which catalytically converts NOx in an exhaust flow containing products of combustion and efficiency of the catalytic conversion of NOx to $N_2$ and $H_2O$ by ammonia, the method comprising: in a processor-based engine control module:
   controlling the introduction of ammonia into the exhaust flow upstream of the SCR catalyst by the ammonia delivery system over an interval of time in sufficient quantity without significant ammonia slip past the SCR catalyst until the quantity of ammonia stored on the SCR catalyst reaches substantially the maximum ammonia storage capacity of the SCR catalyst, and
   during the interval of time, executing an algorithm a) to calculate the quantity of ammonia stored on the SCR catalyst at various times during the interval of time by processing certain data, including the aggregate quantity of ammonia introduced into the exhaust flow by the ammonia delivery system during the interval of time, b) to calculate efficiency of catalytic conversion of NOx to $N_2$ and $H_2O$ by ammonia at each of the various times by processing certain data, including NOx measurements obtained from an upstream NOx sensor upstream of the introduction of ammonia into the exhaust flow and a downstream NOx sensor downstream of the SCR catalyst, c) establishing a correlation between NOx conversion efficiency and ammonia stored on the SCR catalyst over the interval of time which comprises calculated NOx conversion efficiency and calculated ammonia stored on the SCR catalyst at each of the various times.

6. The method set forth in claim 5 comprising controlling the introduction of ammonia into the exhaust system by the ammonia delivery system over the interval of time by causing ammonia storage to build in discrete incremental quantities on the SCR catalyst, and after the quantity of ammonia stored on the SCR catalyst has been incremented by each incremental quantity, controlling the introduction of ammonia to maintain the quantity of ammonia stored on the SCR catalyst substantially constant until the ammonia storage on the SCR catalyst is incremented by an immediately following incremental quantity of ammonia.

7. The method set forth in claim 5 including detecting ammonia slip by an ammonia sensor downstream of the SCR catalyst.

8. The method set forth in claim 7 further comprising correlating quantity of ammonia stored on the SCR catalyst and quantity of ammonia slip detected by the ammonia sensor during the interval of time.

9. A system for establishing a correlation between quantity of ammonia stored on an SCR catalyst which catalytically converts NOx in an exhaust flow containing products of combustion and efficiency of the catalytic conversion of NOx to $N_2$ and $H_2O$ by ammonia, the system comprising:
   an ammonia delivery system for introducing ammonia into the exhaust flow upstream of the SCR catalyst for entrainment with exhaust flow toward the SCR catalyst to build ammonia storage on the SCR catalyst;
   an upstream NOx sensor upstream of the introduction of ammonia into the exhaust system;
   a downstream NOx sensor downstream of the SCR catalyst; and
   a processor for controlling the introduction of ammonia into the exhaust flow by the ammonia delivery system over an interval of time in sufficient quantity without significant ammonia slip past the SCR catalyst until the quantity of ammonia stored on the SCR catalyst reaches substantially the maximum ammonia storage capacity of the SCR catalyst;
   the processor also comprising an algorithm which is operable a) to calculate the quantity of ammonia stored on the SCR catalyst at various times during the interval of time by processing certain data, including the aggregate quantity of ammonia introduced into the exhaust flow by the ammonia delivery system during the interval of time, b) to calculate the efficiency of catalytic conversion of NOx to $N_2$ and $H_2O$ by ammonia at each of the various times by processing certain data, including NOx measurements obtained from the upstream NOx sensor and the downstream NOx sensor, and c) to establish a correlation between efficiency of catalytic conversion of NOx to $N_2$ and $H_2O$ by ammonia and quantity of ammonia stored on the SCR catalyst over the interval of time which comprises calculated efficiency of catalytic conversion of NOx to $N_2$ and $H_2O$ by ammonia and calculated quantity of ammonia stored on the SCR catalyst at each of the various times.

10. The system set forth in claim 9 in which the algorithm is also operable to control the introduction of ammonia into the exhaust flow by the ammonia delivery system over the interval of time by causing ammonia storage on the SCR catalyst to build in discrete incremental quantities after each of which the introduction of ammonia is controlled to maintain the quantity of ammonia stored on the SCR catalyst substantially constant until the ammonia storage on the SCR catalyst is incremented by an immediately following incremental quantity of ammonia.

11. The system set forth in claim 9 including an ammonia sensor downstream of the SCR catalyst for detecting ammonia slip.

12. The system set forth in claim 11 in which the processor is also operable during the interval of time to correlate quantity of ammonia stored on the SCR catalyst and quantity of ammonia slip detected by the ammonia sensor.

* * * * *